(12) United States Patent
Kim (10) Patent No.: US 9,574,591 B2
(45) Date of Patent: Feb. 21, 2017

(54) ADJUSTABLE VERTICAL PIPE SUPPORT

(71) Applicant: Namsoo Kim, Gyeonggi-do (KR)

(72) Inventor: Namsoo Kim, Gyeonggi-do (KR)

(73) Assignees: Namsoo Kim, Yongin-si, Gyeonggi-do (KR); Jong Hag Kim, Namyangju-si, Gyeonggi-do (KR)

(*) Notice: Subject to any disclaimer, the term of this patent is extended or adjusted under 35 U.S.C. 154(b) by 0 days.

(21) Appl. No.: 14/952,046

(22) Filed: Nov. 25, 2015

(65) Prior Publication Data

US 2017/0016466 A1    Jan. 19, 2017

(30) Foreign Application Priority Data

Jul. 15, 2015 (KR) .................. 10-2015-0100613

(51) Int. Cl.
*E04G 25/08* (2006.01)
*F16B 7/14* (2006.01)

(52) U.S. Cl.
CPC .............. *F16B 7/1472* (2013.01); *F16B 7/149* (2013.01)

(58) Field of Classification Search
CPC ........ E04G 25/04; E04G 25/08; F16B 7/1445; F16B 7/1463; F16B 7/149; F16B 7/182
See application file for complete search history.

(56) References Cited

U.S. PATENT DOCUMENTS

| | | | | |
|---|---|---|---|---|
| 2,507,261 A * | 5/1950 | Mercier | ............... | F16L 19/075 174/85 |
| 4,277,197 A * | 7/1981 | Bingham | ................ | B25G 1/04 403/104 |
| 5,098,134 A * | 3/1992 | Monckton | ............ | F16L 19/075 285/255 |
| 8,117,787 B2 * | 2/2012 | Lee | ........................ | E04G 25/06 248/354.1 |

FOREIGN PATENT DOCUMENTS

| | | |
|---|---|---|
| JP | 08-144543 A | 6/1996 |
| KR | 20-0291531 Y1 | 10/2002 |
| KR | 10-2008-0074688 A | 8/2008 |
| KR | 10-2009-0110021 A | 10/2009 |
| KR | 10-2014-0090409 A | 7/2014 |

* cited by examiner

Primary Examiner — Michael P Ferguson
(74) Attorney, Agent, or Firm — Rabin & Berdo, P.C.

(57) ABSTRACT

Disclosed is an adjustable vertical pipe support, in which a second saw-toothed portion is positioned in a wedge of a length adjusting member for adjusting a length of upper and lower pipes, so as to prevent unlocking or slip of the upper pipe and thus improve the safety of the vertical pipe support, even though a first rotation adjustor is rotated by a tensile force or an external force. The adjustable vertical pipe support includes a wedge with a first and second saw-toothed portion on the inner peripheral surface, in which any one of the first saw-toothed portion and the second saw-toothed portion is inclined upwardly so as to suppress downward movement of the upper pipe, and the other is inclined downwardly or is formed in the shape of a ridge so as to suppress upward movement of the upper pipe.

6 Claims, 13 Drawing Sheets

ADJUSTABLE VERTICAL PIPE SUPPORT

BACKGROUND OF THE INVENTION

Field of the Invention

The present invention relates to an adjustable vertical pipe support, in which a second saw-toothed portion is positioned in a wedge of a length adjusting member for adjusting a length of upper and lower pipes, so as to prevent unlocking or slip of the upper pipe and thus improve the safety of the vertical pipe support, even though a first rotation adjustor is rotated by a tensile force or an external force.

Background of the Related Art

Recently, there has been a string of industrial accidents due to breaking of temporary pipe supports and scaffolds. In particular, the accidents usually happen in the process of installing or uninstalling the pipe supports which are widely used for slabs of reinforced concrete structures.

Figure 1:
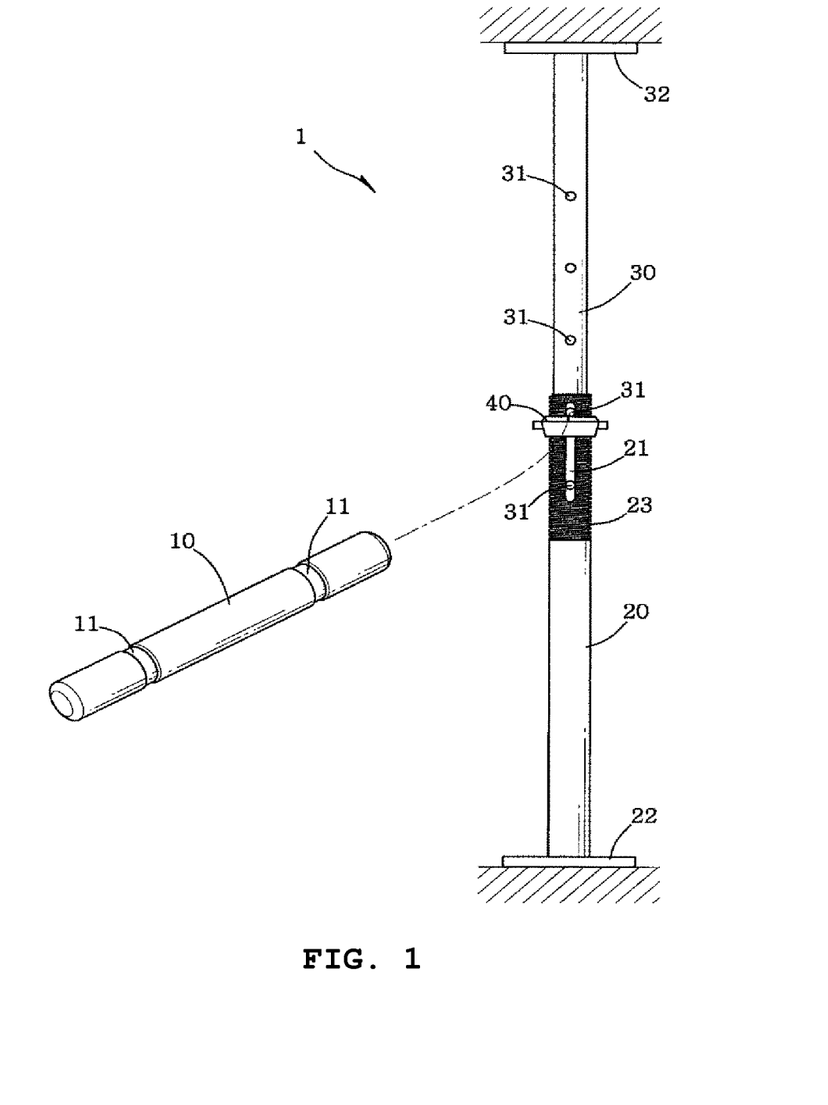
FIG. 1 is a view illustrating an adjustable vertical pipe support according to the related art.

A pipe support 1 of the related art illustrated in FIG. 1 includes an upper pipe 30 having a plurality of holes 31, a lower pipe 20 having an elongated hole 21, a locking pin 10 inserted in any one of the holes 31 formed in the upper pipe 30, and a length adjusting nut 40 threadedly engaging to the lower pipe 20 to support the locking pin 10 and adjust the height of the pipe support 1 by rotation thereof.

However, the pipe support 1 of the related art has a problem in that since the upper pipe 30 and the lower pipe 20 are perforated, the pipes suffer a loss in cross section. In particular, the pipe supports 1, to which a compressive force is applied, are very vulnerable to buckling, if a portion of the cross section is damaged or broken.

In addition, since any gap is formed between an outer diameter of the upper pipe 30 and an inner diameter of the lower pipe 20, the upper pipe 30 is not firmly locked to the lower pipe 20. Thus, when the compressive force is applied to the pipe support, the pipe support 1 is applied by an eccentric load, so that the pipe support 1 may be deflected. As the length of the pipe support 1 is long, the pipe support 1 will not properly support an allowable load.

Also, since the length adjusting nut 40 is positioned below the locking pin 10, and supports the load applied from the top, the length adjusting nut 40 does not withstand a tensile force.

Figure 2:
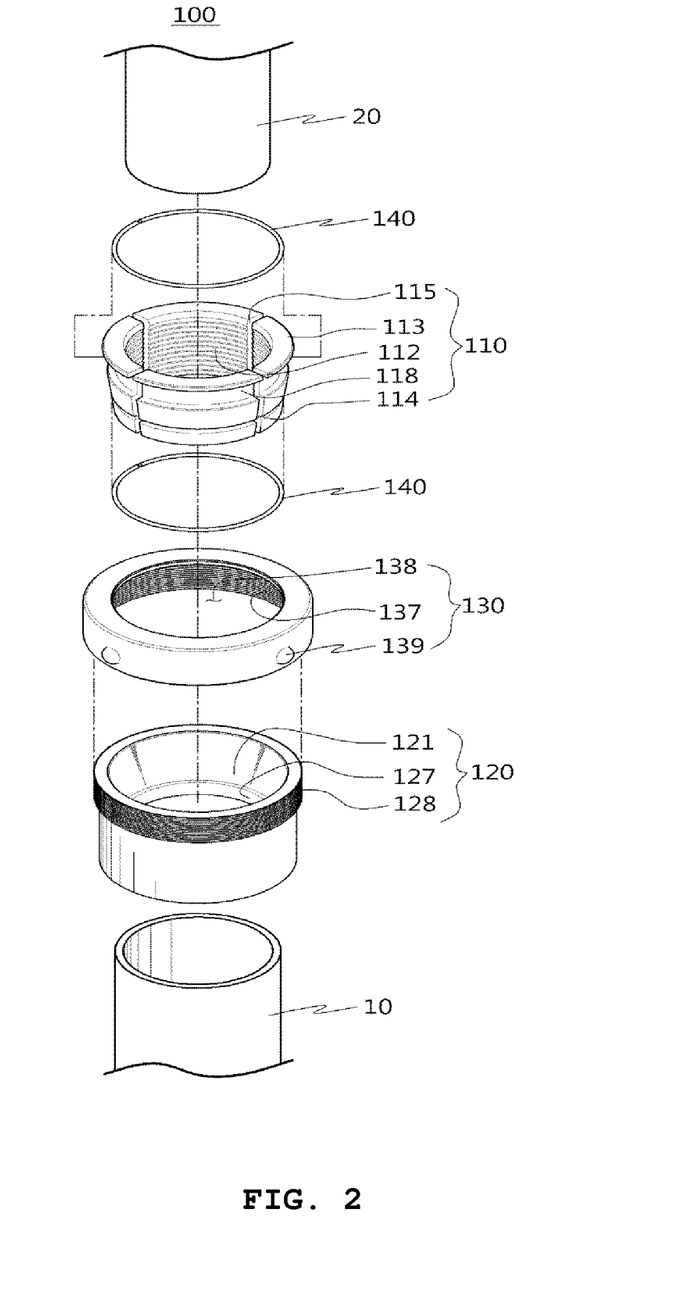
FIG. 2 is a view illustrating an adjustable vertical pipe support for construction according to the related art.

As illustrated in FIG. 2, Korea Patent No. 10-0979817 discloses a pipe support for construction, in which an upper pipe 20 is locked by stoppers 110 and 120 so as to stably and firmly support the load.

In general, since temporary pipe supports are not permanently fixed, an unexpected tensile force may be applied to the pipe supports by lateral loads, wind loads, or work impact loads to be generated when the pipe supports are installed, uninstalled, or retained.

According to the pipe support disclosed in the patent, if the outer stopper 120 is rotated in an opposite direction by the tensile load or the external impact, the upper pipe 20 immediately comes out from the inner stopper 110, and thus the upper pipe is unlocked, which causes the industrial accident.

Also, in case of system scaffolds, of which girders, struts and braces are prefabricated at a plant and then are assembled on the spot, the tensile force is generated from any members according to load conditions. The pipe support cannot be used due to risks of collapse when the tensile force is generated.

When the pipe support is assembled, the upper pipe 20 is inserted into or pulled out from the lower pipe 10, and then is approximately locked. After that, the height of the pipe support should be set by minutely adjusting in order to level an upper member. However, the pipe support disclosed in the patent is difficult to adjust the height of the pipe support since the fine adjustment is impossible after the position of the upper pipe 20 is locked.

SUMMARY OF THE INVENTION

Therefore, the present invention has been made in view of the above problems, and an object of the present invention is to provide an adjustable vertical pipe support capable of preventing an upper pipe from being unlocked or slipping when a tensile force or external impact is applied thereto, thereby improving its safety.

The other object of the present invention is to provide an adjustable vertical pipe support which can be stably used when a tensile force is applied thereto, thereby being applied to a system scaffold.

Another object of the present invention is to provide an adjustable vertical pipe support capable of preventing a risk of buckling which is caused by a loss in cross section, in which upper and lower pipes constituting the pipe support are not perforated.

Still another object of the present invention is to provide an adjustable vertical pipe support capable of minutely adjusting a position of an upper pipe, thereby accurately positioning the pipe support while leveling an upper member.

According to an aspect of the preset invention, there is provided an adjustable vertical pipe support including: a lower hollow pipe which is formed in the shape of a hollow tube; an upper pipe which is inserted and coupled to an upper end of the lower pipe; and a length adjusting member which selectively locks the upper pipe to the upper end of the lower pipe to adjust a length of the vertical pipe support, wherein the length adjusting member includes a coupler which is formed in the shape of a hollow tube and has a lower end fixed to the lower pipe, of which an outer peripheral surface is formed with a threaded portion, and an upper portion of an inner peripheral surface is formed with a tapered portion with a diameter being decreased toward a lower portion; a wedge which is divided into a plurality of segments at regular intervals to lock the upper pipe to be inserted therein, of which a portion of a lower portion is inserted in the tapered portion of the coupler, and an outer peripheral surface of an upper portion is formed with a locking groove; and a first rotation adjustor having a female threaded portion formed on an inner peripheral surface which is threadedly engaged to the outer peripheral surface of the upper portion of the coupler, and a wedge locking boss formed on an inner portion of an upper end which is inserted into the locking groove of the wedge to be able to move in a vertical direction, in which a first saw-toothed portion is formed on the inner peripheral surface of the wedge in a circumferential direction to have a desired height from a lower end thereof, and a second saw-toothed portion is formed on the inner peripheral surface above the first saw-toothed portion in the circumferential direction, and extends to an upper end of the peripheral surface, and in which any one of the first saw-toothed portion and the second saw-toothed portion is inclined upwardly so as to suppress downward movement of the upper pipe, and the other is inclined downwardly or is formed in the shape of a ridge so as to suppress upward movement of the upper pipe.

According to a preferred embodiment, the first sawtoothed portion is inclined upwardly, and the second sawtoothed portion is inclined downwardly or formed in the shape of the ridge.

According to a preferred embodiment, the coupler is divided into a first upper coupler and a second lower coupler, the first coupler and the second coupler are formed with a threaded portion on outer peripheral surfaces thereof, so that the first rotation adjustor is threadedly engaged to an outer peripheral surface of an upper portion of the first coupler, and a lower portion of the first coupler and an outer peripheral surface of the second coupler are formed with a female threaded portion, so that the second rotation adjustor is threadedly engaged to the female threaded portion to adjust a distance between the first coupler and the second coupler by rotation.

According to a preferred embodiment, the inner peripheral surface of the lower end of the coupler is formed with a stepped portion, so that the lower pipe is interference fitted to the stepped portion.

According to a preferred embodiment, the first coupler and the second coupler are configured in such a way that the lower end of the first coupler is inserted into the upper end of the second coupler, or the upper end of the second coupler is inserted into the lower end of the first coupler, and then the lower portion of the first coupler is partially overlapped with the upper portion of the second coupler.

According to a preferred embodiment, a contact surface between the lower portion of the first coupler and the upper portion of the second coupler which are overlapped with each other are formed with guide bosses and guide grooves in a vertical direction, respectively.

With the above configuration, the adjustable vertical pipe support of the present invention has the following advantages.

First, since the second saw-toothed portion is positioned in the wedge of the length adjusting member for adjusting the length of the upper and lower pipes, so as to prevent unlocking or slip of the upper pipe and thus improve the safety of the vertical pipe support, even though the first rotation adjustor is rotated by the tensile force or the external force.

Second, since the upper pipe is firmly locked even though the tensile force is applied thereto, the present invention can be applied to a system scaffold, of which members are prefabricated at a plant and then are assembled on the spot.

Third, since the upper and lower pipes constituting the pipe support are not perforated, it is possible to prevent the risk of buckling which is caused by the loss in cross section.

Finally, if the couple is divided into the first and second couplers, and the distance between the first and second couples is adjusted by the second rotation adjustor, it is possible to accurately adjust the length of the vertical pipe support.

DETAILED DESCRIPTION OF THE PREFERRED EMBODIMENT

Preferred embodiments of the present invention will now be described in detail with reference to the accompanying drawings.

Figure 3:
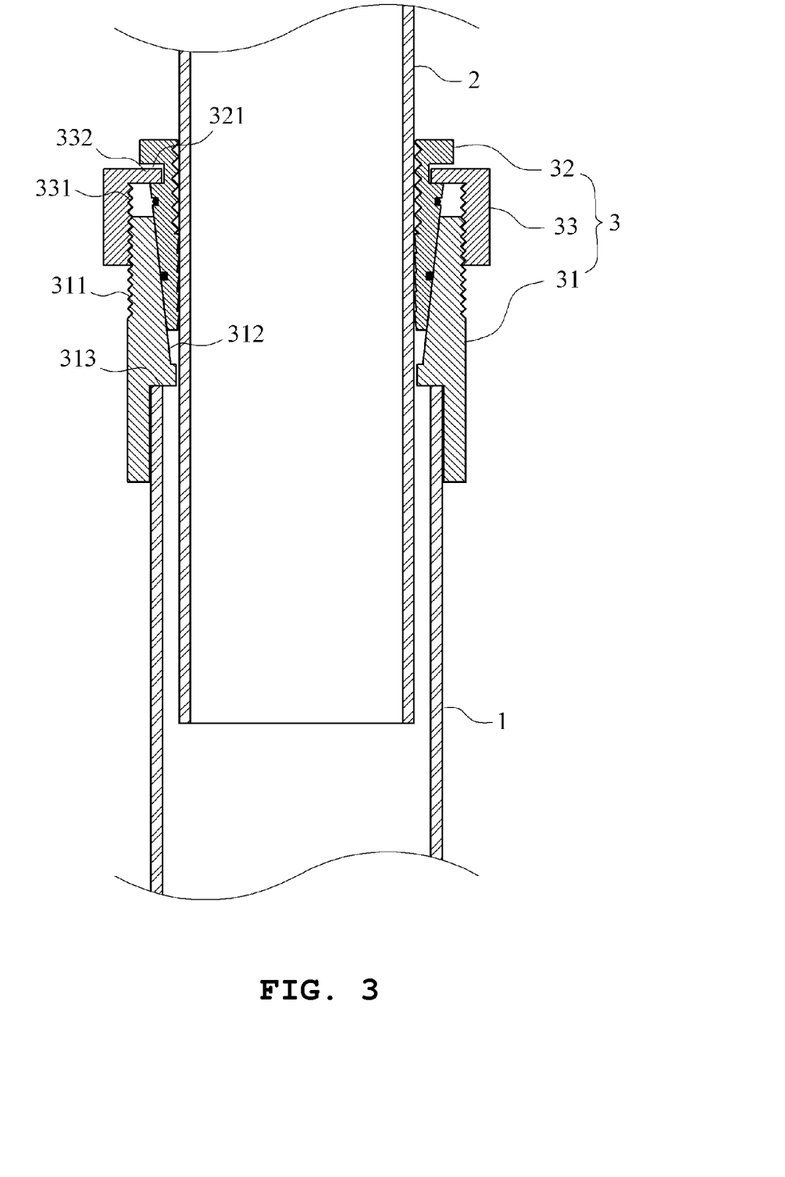
FIG. 3 is a cross-sectional view illustrating an adjustable vertical pipe support according to a first embodiment of the present invention.
Figure 4:
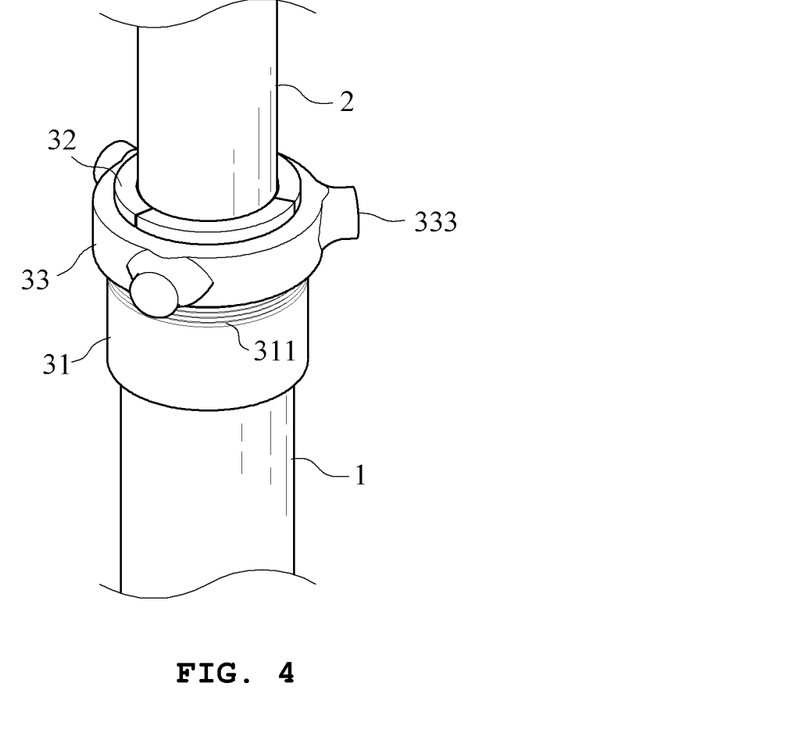
FIG. 4 is a perspective view illustrating the adjustable vertical pipe support according to the first embodiment of the present invention.
Figure 5:
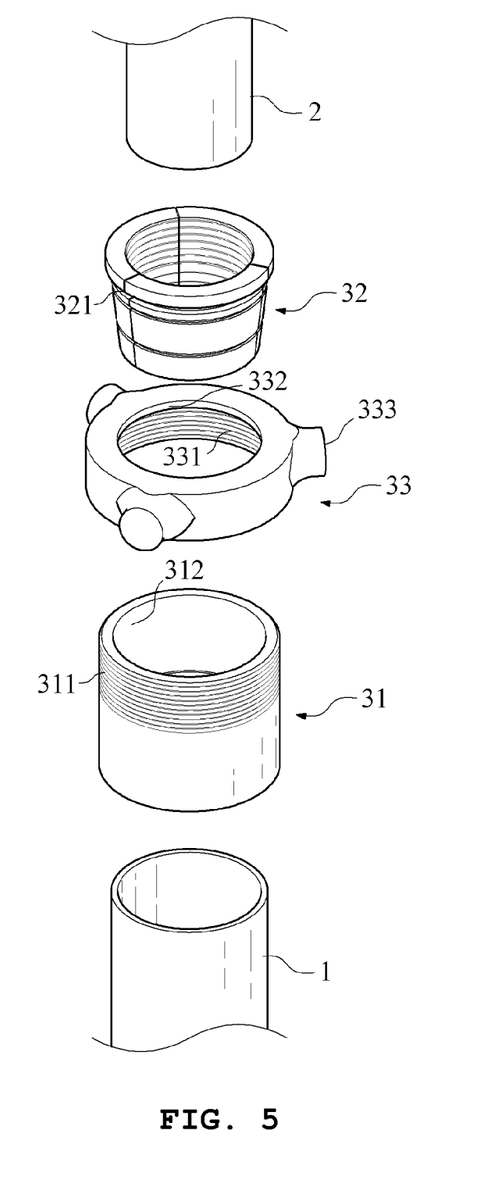
FIG. 5 is an exploded perspective view illustrating the adjustable vertical pipe support according to the first embodiment of the present invention.

FIG. 3 is a cross-sectional view illustrating an adjustable vertical pipe support according to a first embodiment of the present invention. FIG. 4 is a perspective view illustrating the adjustable vertical pipe support according to the first embodiment of the present invention. FIG. 5 is an exploded perspective view illustrating the adjustable vertical pipe support according to the first embodiment of the present invention.

The adjustable vertical pipe support according to the first embodiment includes a lower hollow pipe 1 formed in the shape of a hollow tube, an upper pipe 2 which is inserted and coupled to an upper end of the lower pipe 1, and a length adjusting member 3 which selectively locks the upper pipe 2 to the upper end of the lower pipe 1 to adjust a length of the vertical pipe support.

An outer diameter of the upper pipe 2 is smaller than an inner diameter of the lower pipe 1, such that the upper pipe 2 can be inserted into the upper end of the lower pipe 1. An upper end of the upper pipe 2 can be connected to a support plate so as to support a mold or the like.

The lower pipe 1 is formed in the shape of the hollow tube, of which a lower end is positioned on the ground, and the upper end is engaged to the upper pipe 2.

The upper pipe 2 and the lower pipe 1 may be made of a steel pipe, but the present invention is not limited thereto.

The length adjusting member 3 is configured to lock the upper pipe 2 to the lower pipe 1 and also adjust the length of the vertical pipe support, and includes a coupler 31, a wedge 32, and a first rotation adjustor 33.

Specifically, as illustrated in FIGS. 3 to 5, the length adjusting member 3 includes the coupler 31 formed in the shape of a hollow tube and having a lower end fixed to the lower pipe 1, of which an outer peripheral surface is formed with a threaded portion 311, and an upper portion of an inner peripheral surface is formed with a tapered portion 312 with a diameter being decreased toward a lower portion; the wedge 32 which is divided into a plurality of segments at regular intervals to lock the upper pipe 2 to be inserted therein, of which a portion of a lower portion is inserted in the tapered portion 312 of the coupler 31, and an outer peripheral surface of an upper portion is formed with a locking groove 321; and the first rotation adjustor 33 having a female threaded portion 331 formed on an inner peripheral surface which is threadedly engaged to the outer peripheral surface of the upper portion of the coupler 31, and a wedge locking boss 332 formed on an inner portion of an upper end which is inserted into the locking groove 321 of the wedge 32 to be able to move in a vertical direction. A first saw-toothed portion 322 is formed on the inner peripheral surface of the wedge 32 in a circumferential direction to have a desired height from a lower end thereof, and a second saw-toothed portion 323 is formed on the inner peripheral surface above the first saw-toothed portion 322 in the circumferential direction, and extends to an upper end of the peripheral surface. Any one of the first saw-toothed portion 322 and the second saw-toothed portion 323 is inclined upwardly so as to suppress downward movement of the upper pipe 2, but the other is inclined downwardly or is formed in the shape of a ridge so as to suppress upward movement of the upper pipe 2.

The coupler 31 is formed in the shape of the hollow tube, of which the lower end is fixed to the lower pipe 1. The outer peripheral surface is formed with the threaded portion 311, and the upper portion of the inner peripheral surface is formed with the tapered portion 312 with the diameter being decreased toward the lower portion;

The coupler 31 may be engaged to the lower pipe 1 by welding, but, as illustrated in FIG. 3, and the inner peripheral surface of the lower end of the coupler 31 is formed with a stepped portion 313, so that the lower pipe 1 can be interference fitted to the stepped portion 313.

If the lower pipe 1 is interference fitted to the stepped portion 313 of the coupler 31, the lower pipe 1 can be firmly locked by a worker, without requiring a welding process.

The threaded portion 311 of the coupler 31 is to be engaged with the first rotation adjustor 33, and may be formed on only the upper end of the outer peripheral surface of the coupler 31.

The wedge 32 is inserted into the tapered portion 312 of the coupler 31 to press the upper pipe 2.

The wedge 32 may be formed to have a slope surface of which a diameter of an outer peripheral surface is decreased toward the lower portion, so as to correspond to the tapered portion 312 of the coupler 31.

If the wedge 32 is inserted into the coupler 31, and then is moved along the tapered portion 312, the wedge 32 is further pressed to strongly lock the upper pipe 2.

The inner surface of the wedge 32 is formed with the first saw-toothed portion 322 and the second saw-toothed portion 323, and these saw-toothed portions press the outer peripheral surface of the upper pipe 2 inserted into the wedge 32, thereby locking the upper pipe 2.

In particular, the second saw-toothed portion 323 formed on the inner upper portion of the wedge 32 prevents the upper pipe 2 from being unlocked or slipping to improve the safety of the vertical pipe support, if a tensile force is applied to the upper pipe 2, or the first rotation adjustor 33 is rotated by external impact.

Accordingly, the adjustable vertical pipe support of the present invention can be widely applied to system scaffolds, of which girders, struts and braces are prefabricated at a plant and then are assembled on the spot.

Since the vertical pipe support is usually applied by a compressive force which presses the upper pipe 2 into the lower pipe 1, a resistance to downward movement should be larger than a resistance to upward movement.

Figure 6A:
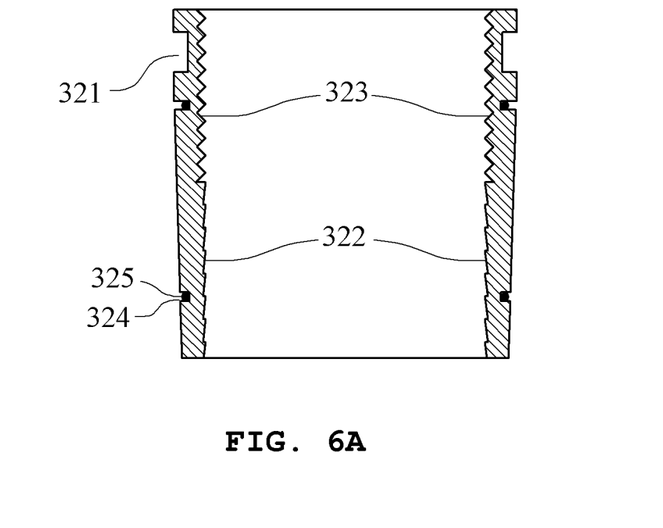
FIGS. 6A and 6B are cross-sectional views illustrating examples of a wedge.
Figure 6B:
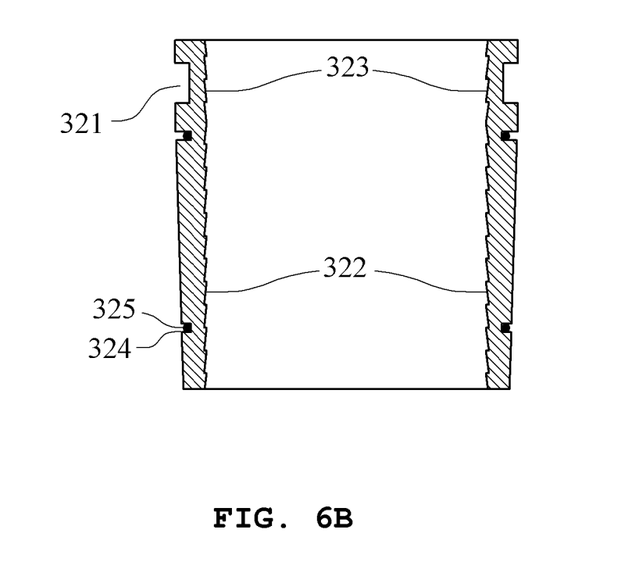

As illustrated in FIG. 6B, it is preferable that if the second saw-toothed portion 323 is formed to be inclined downwardly, which will be described later, a length of a section of the first saw-toothed portion 322 is longer than that of a section of the second saw-toothed portion 323.

Alternatively, if the second saw-toothed portion 323 is formed in the shape of the ridge, the second saw-toothed portion 323 may share the resistance to the downward movement. Therefore, the length of the first saw-toothed portion 322 may be equal to that of the section of the second saw-toothed portion 323 (see FIG. 6A).

The wedge 32 is divided into the plurality of wedge segments at regular intervals. In the embodiment illustrated in FIG. 4, the wedge 32 of three wedge segments is shown, but the wedge 32 may have two, four or more wedge segments.

The wedge locking boss 332 of the first rotation adjustor 33 is inserted into the locking groove 321 formed on the outer peripheral surface of the upper portion of the wedge 32. The wedge locking boss 332 presses the wedge 32 downwardly to lock the upper pipe 2, as the first rotation adjustor 33 rotates. On the contrary, when the vertical pipe support is disassembled, the wedge locking boss 332 presses the wedge 32 upwardly to unlock the upper pipe 2.

The inner peripheral surface of the first rotation adjustor 33 is formed with the female threaded portion 331 which is threadedly engaged with the threaded portion 311 formed on the outer peripheral surface of the coupler 31.

The wedge locking boss 332 formed on the first rotation adjustor 33 is inserted in the locking groove 321 of the wedge 32 which has been described above, to be able to move in a vertical direction.

The engaging process of the upper and lower pipes 1 and 2 constituting the adjustable vertical pipe support according to the present invention will now be described.

First, the upper pipe 2 is approximately inserted into or pulled out from the lower pipe 1 to have a desired length, the first rotation adjustor 33 is rotated and moved down along the threaded portion 311 of the coupler 31 which is engaged to the upper end of the lower pipe 1.

The wedge locking boss 332 of the first rotation adjustor 33 presses the wedge 32 downwardly in the locking groove 321 of the wedge 32 positioned at the outside of the upper pipe 2, and thus the wedge 32 moves inwardly along the tapered portion 312 of the coupler 31 so as to be fastened, thereby locking the upper pipe 2.

In this instance, any one of the first saw-toothed portion 322 and the second saw-toothed portion 323 which are formed on the inner peripheral surface of the wedge 32 suppresses the downward slip of the upper pipe 2 to firmly lock the upper pipe, and the other suppresses upward slip of the upper pipe 2 and thus prevents the unlocking of the upper pipe, even though the tensile force is applied thereto from the exterior.

In the embodiment illustrated in FIG. 3, the first saw-toothed portion 322 is inclined upwardly so as to suppress the downward slip of the upper pipe 2, and the second saw-toothed portion 323 is formed in the shape of the ridge so as to suppress the slip of the upper pipe 2 due to the tensile force.

On the contrary, when the upper and lower pipes 1 and 2 are disassembled, the first rotation adjustor 33 is rotated in an opposite direction, and thus the first rotation adjustor 33 is moved upwardly along the threaded portion 311 of the coupler 31.

The wedge locking boss 332 of the first rotation adjustor 33 presses the upper portion of the locking groove 321 of the wedge 32, and thus the wedge 32 is moved upwardly to unlock the wedge 32. In this instance, if an elastic ring 325 is inserted into a ring groove 324 formed on the outer peripheral surface of the wedge 32, the respective wedge segments of the wedge 32 is inwardly tightened by the elastic ring 325, thereby easily disassembling the vertical pipe support.

According to the configuration of the present invention, the coupler 31, the wedge 32, and the first rotation adjustor 33 of the length adjusting member 3 for engaging the upper pipe 2 and the lower pipe 1 are positioned at the outside of the upper and lower pipes 1 and 2 to engage each other. Therefore, since the upper and lower pipes 1 and 2 are not necessarily perforated, it is possible to prevent a risk of buckling which is caused by a loss in cross section.

FIGS. 6A and 6B are cross-sectional views illustrating examples of the wedge.

The first saw-toothed portion 322 formed on the wedge 32 is inclined upwardly, and the second saw-toothed portion 323 is inclined downwardly or is formed in the shape of the ridge.

Since the pressing force of the wedge 32 is stronger at the lower portion having the small diameter, the first saw-toothed portion 322 which is inclined upwardly to resist the compressive force is positioned at the lower portion, and the second saw-toothed portion 323 which is inclined downwardly, as illustrated in FIG. 6B, or is formed in the shape of the ridge, as illustrated in FIG. 6A, is positioned at the upper portion.

As can be seen from FIGS. 6A and 6B, the outer peripheral surface of the wedge 32 may be formed with at least one ring groove 324.

The circular elastic ring 325 is inserted in the ring groove 324 to tighten the wedge 32 which is divided into the plurality of wedge segments.

Figure 7:
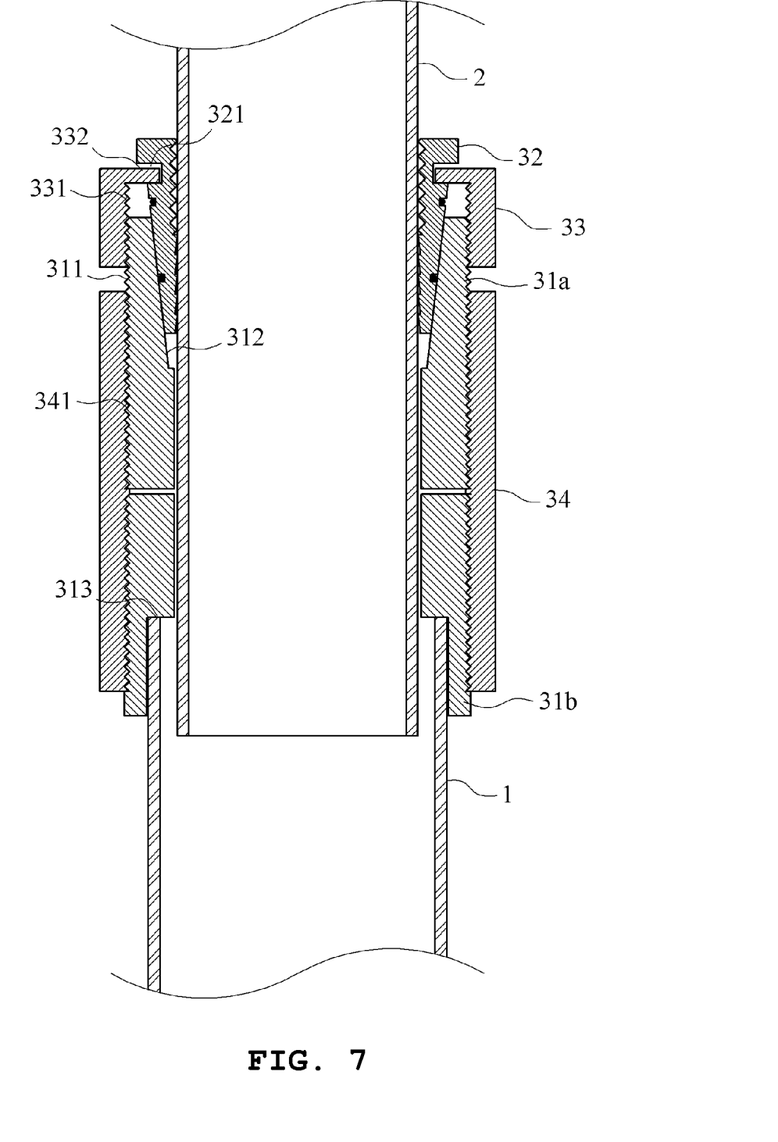
FIG. 7 is a cross-sectional view illustrating an adjustable vertical pipe support according to a second embodiment of the present invention.
Figure 8:
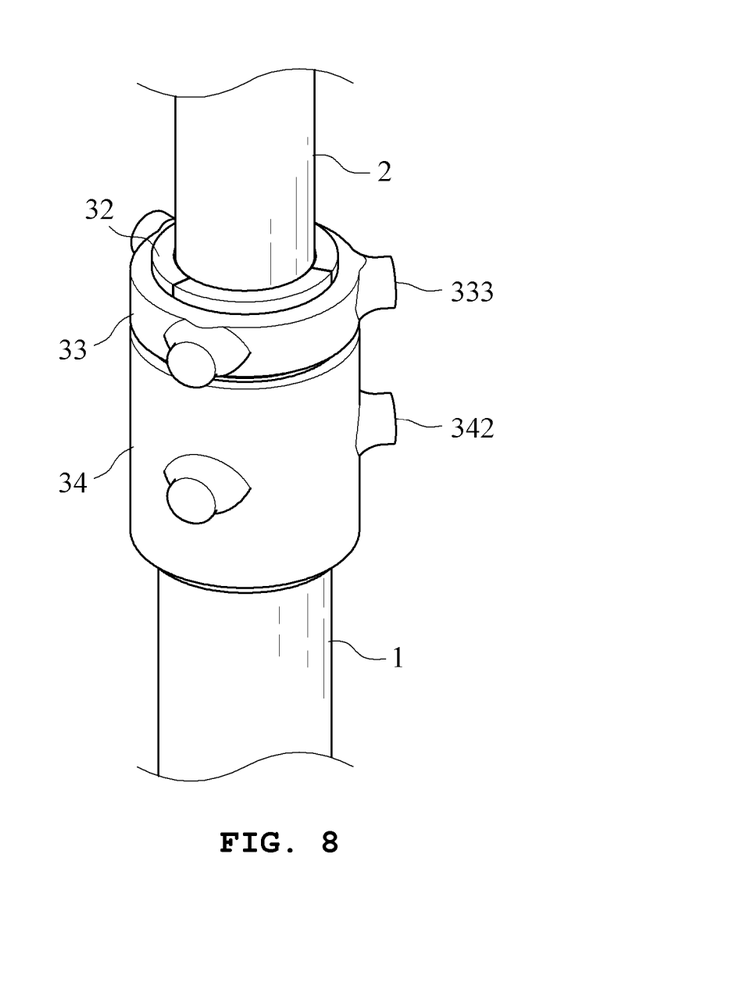
FIG. 8 is a perspective view illustrating the adjustable vertical pipe support according to the second embodiment of the present invention.
Figure 9:
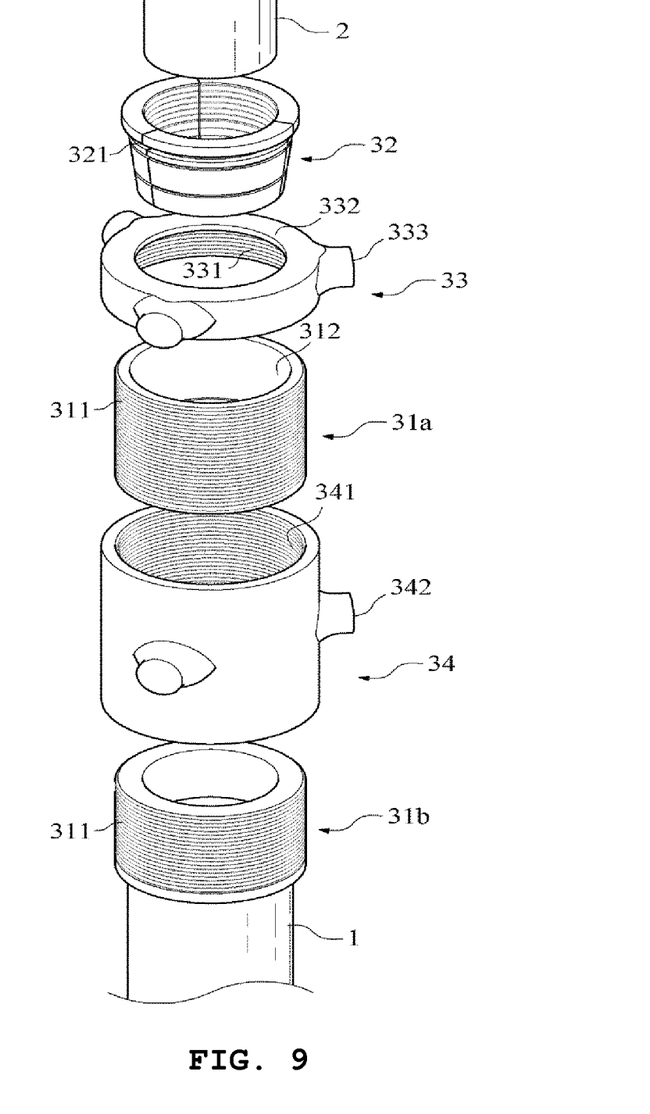
FIG. 9 is an exploded perspective view illustrating the adjustable vertical pipe support according to the second embodiment of the present invention.

FIG. 7 is a cross-sectional view illustrating an adjustable vertical pipe support according to the second embodiment of the present invention. FIG. 8 is a perspective view illustrating the adjustable vertical pipe support according to the second embodiment of the present invention. FIG. 9 is an exploded perspective view illustrating the adjustable vertical pipe support according to the second embodiment of the present invention.

As illustrated in FIGS. 7 to 9, the coupler 31 is divided into a first upper coupler 31a and a second lower coupler 31b. The first coupler 31a and the second coupler 31b are formed with the threaded portion 311 on outer peripheral surfaces thereof. The first rotation adjustor 33 is threadedly engaged to an outer peripheral surface of an upper portion of the first coupler 31a. A lower portion of the first coupler 31a and an outer peripheral surface of the second coupler 31b are formed with the female threaded portion 341. The second rotation adjustor 34 is threadedly engaged to the female threaded portion 341 to adjust the distance between the first coupler 31a and the second coupler 31b by rotation.

In the case where the coupler 31 is divided into the first coupler 31a and the second coupler 31b, after the upper pipe 2 and the lower pipe 1 are approximately set to have a predetermined length, the upper pipe 2 is locked to the couple 31 by rotating the first rotation adjustor 33, and the length of the couple 31, that is, the distance between the first couple 31a and the second couple 31b, is minutely altered by rotating the second rotation adjustor 34, thereby finely adjusting the length of the vertical pipe support.

The female threaded portion 331 formed on the inner peripheral surface of the first rotation adjustor 33 is threadedly engaged to the outer peripheral surface of the upper portion of the first coupler 31a.

The female threaded portion 341 formed on the inner peripheral surface of the second rotation adjustor 34, that is, the female threaded portion 341 formed on the upper portion which is engaged to the first coupler 31a and the female threaded portion 341 formed on the lower portion which is engaged to the second coupler 31b, is formed in an opposite direction, so that the first coupler 31a and the second coupler 31b are brought into contact to each other or away from each other by rotation of the second rotation adjustor 34.

As illustrated in FIGS. 4, 8, and so forth, the outer peripheral surface of the first rotation adjustor 33 and/or the second rotation adjustor 34 may be formed with rotation bosses 333 and 342 for the purpose of easy rotation, respectively.

As illustrated in FIG. 7, the inner peripheral surface of the lower end of the second coupler 31b is formed with a stepped portion 313, so that the lower pipe 1 can be interference fitted to the stepped portion 313.

Although the lower pipe 1 is engaged to the second coupler 31b by welding, if the lower pipe 1 is interference fitted to the stepped portion 313 of the second coupler 31b, the lower pipe 1 can be firmly locked by a worker, without requiring a welding process.

Figure 10A:
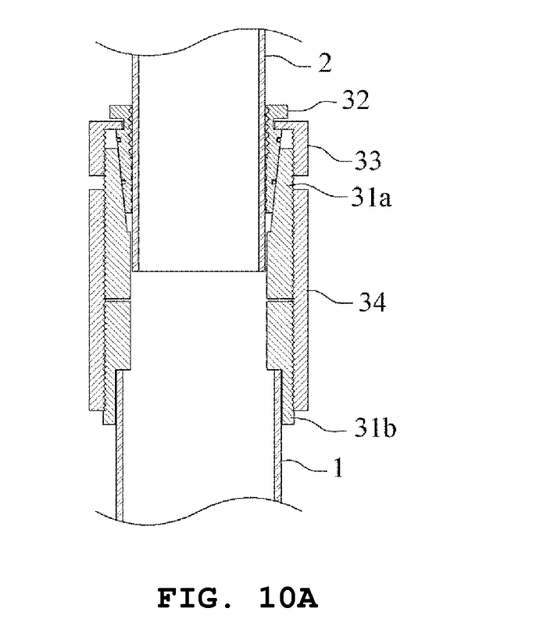
FIGS. 10A to 10C are cross-sectional views illustrating the operation of the adjustable vertical pipe support according to the present invention.
Figure 10B:
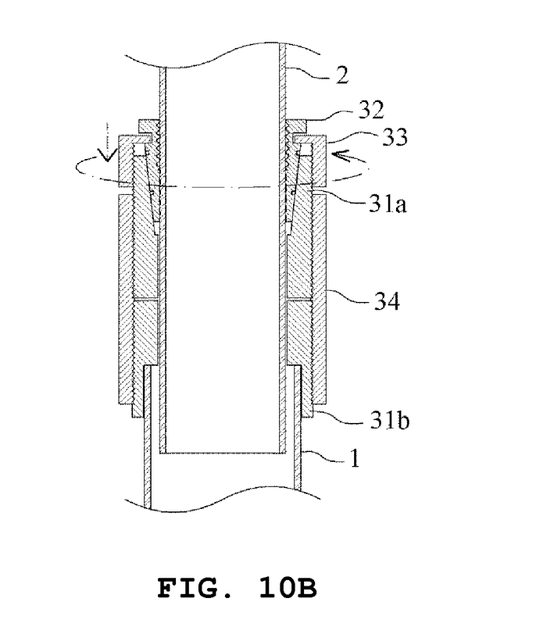
Figure 10C:
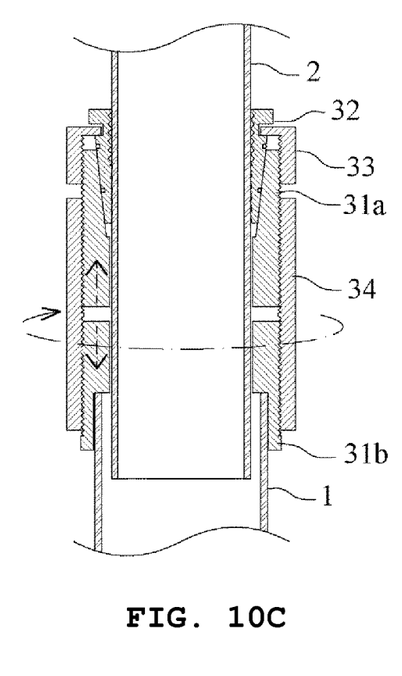

FIGS. 10A to 10C are cross-sectional views illustrating the operation of the adjustable vertical pipe support according to the present invention.

In order to engage the upper pipe 2 and the lower pipe 1, as illustrated in FIG. 10A, first, the upper pipe 2 is approximately inserted into or pulled out from the lower pipe 1 to have a desired length.

As illustrated in FIG. 10B, the first rotation adjustor 33 is rotated and moved down along the threaded portion 311 of the coupler 31 which is engaged to the upper end of the lower pipe 1.

The wedge locking boss 332 of the first rotation adjustor 33 presses the wedge 32 downwardly in the locking groove 321 of the wedge 32 positioned at the outside of the upper pipe 2, and thus the wedge 32 moves inwardly along the tapered portion 312 of the coupler 31 so as to be fastened, thereby locking the coupler 31 and the upper pipe 2.

Finally, as illustrated in FIG. 10C, the distance between the first couple 31a and the second couple 31b is minutely altered by rotating the second rotation adjustor 34, thereby finely adjusting the length of the vertical pipe support. Therefore, the vertical pipe support can support upper molds stably.

Figure 11:
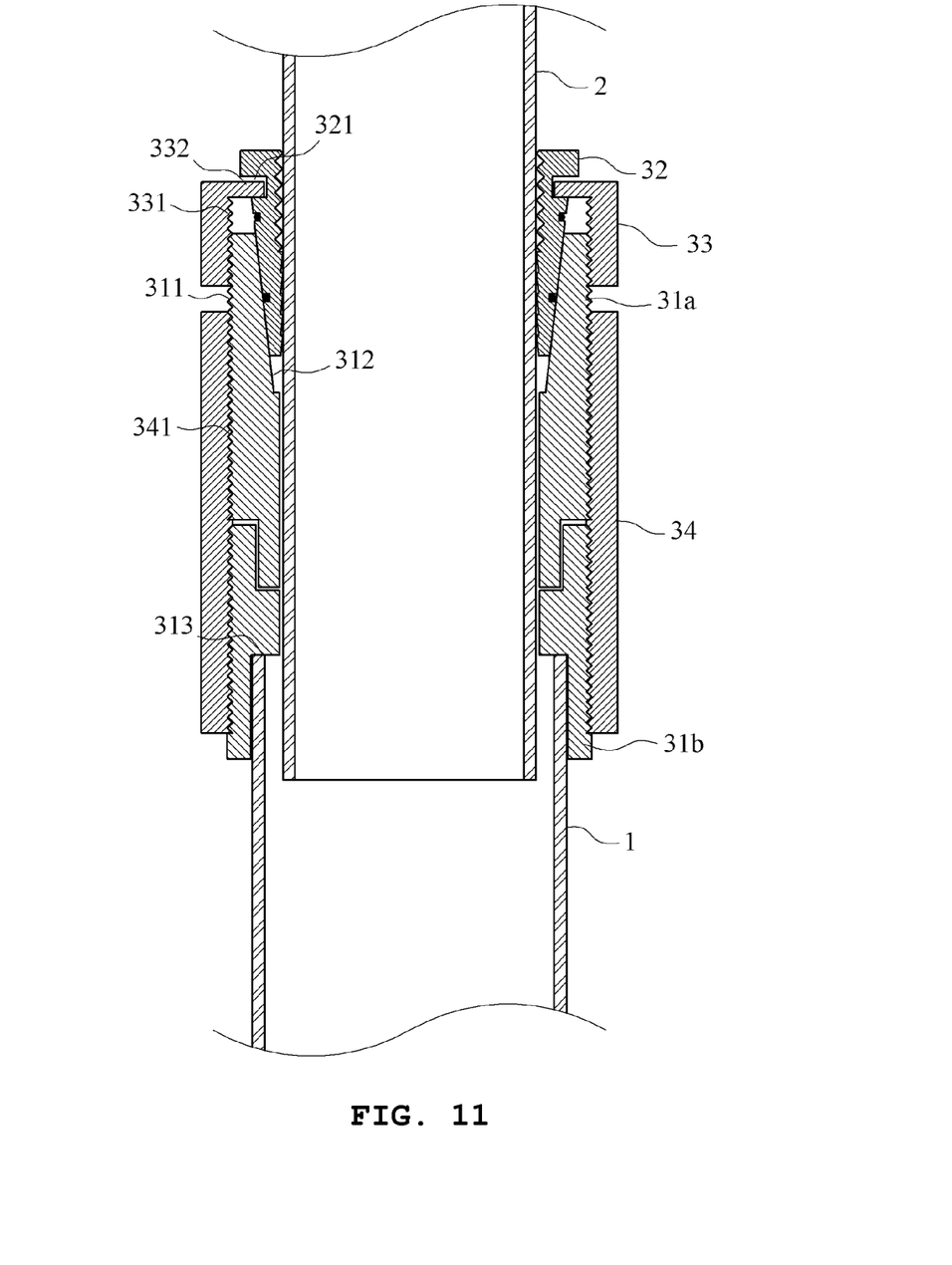
FIG. 11 is a cross-sectional view illustrating the engaging relation between a first coupler and a second coupler according to the first embodiment of the present invention.

FIG. 11 is a cross-sectional view illustrating the engaging relation between a first coupler and a second coupler according to the first embodiment of the present invention.

As can be seen from FIG. 11, the first coupler 31a and the second coupler 31b may be configured in such a way that the lower end of the first coupler 31a is inserted into the upper end of the second coupler 31b, or the upper end of the second coupler 31b is inserted into the lower end of the first coupler 31a, and then the lower portion of the first coupler 31a is partially overlapped with the upper portion of the second coupler 31b.

In the case where the first coupler 31a and the second coupler 31b are configured to be separated, the second rotation adjustor 34 should resist separately the buckling or a lateral load.

Accordingly, the first coupler 31a and the second coupler 31b should be configured to be partially overlapped with each other to improve the resistance to the buckling or the lateral load.

FIG. 11 shows the third embodiment in which the first coupler 31a is inserted into the upper end of the second coupler 31b, but the second coupler 31b may be inserted into the lower end of the first coupler 31a.

Figure 12:
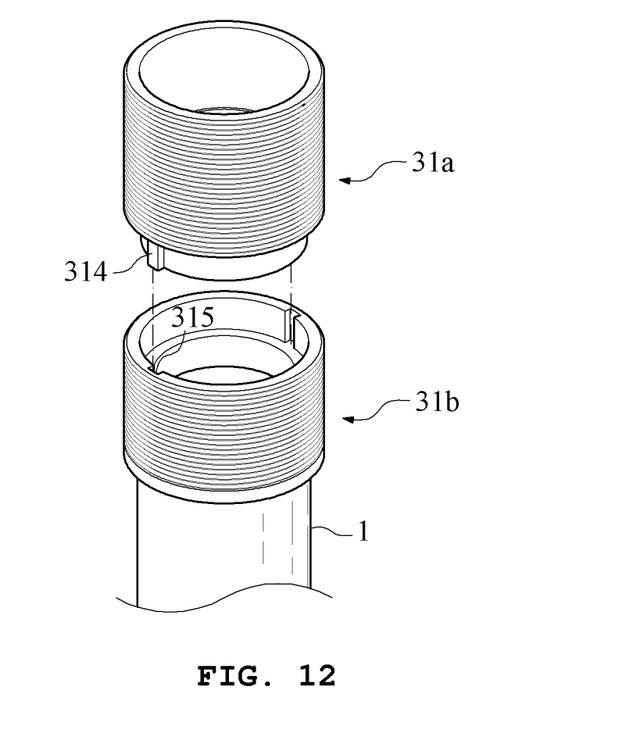
FIG. 12 is an exploded perspective view illustrating a first coupler and a second coupler according to a third embodiment of the present invention.

FIG. 12 is an exploded perspective view illustrating the first coupler and the second coupler according to the third embodiment of the present invention.

As can be seen from FIG. 12, contact surface between the lower portion of the first coupler 31 and the upper portion of the second coupler 31b which are overlapped with each other are formed with guide bosses 314 and guide grooves 315 in the vertical direction, respectively.

If the first coupler 31a or the second coupler 31b is rotated with the second rotation adjustor 34 at rotation of the second rotation adjustor 34, the second rotation adjustor 34 should be more rotated so as to extend the vertical pipe support by the same length, and thus much times are required to adjust the height of the vertical pipe support.

Accordingly, the guide bosses 314 and the guide grooves 315 are configured to be engaged to each other so that the first coupler 31a and the second coupler 31b are not rotated mutually.

FIG. 12 shows the embodiment in which the first coupler 31 and the second coupler 31b are formed with the guide bosses 314 and the guide grooves 315, respectively, but the first coupler 31 and the second coupler 31b may be formed with guide grooves and guide bosses, respectively.

Although not shown in the drawings, the first and second rotation adjustors 33 and 34 may be formed to have a polygonal cross section for the purpose of easy rotation.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An adjustable vertical pipe support comprising:
   a lower hollow pipe (1) which is formed in the shape of a hollow tube;
   an upper pipe (2) which is inserted and coupled to an upper end of the lower pipe (1); and
   a length adjusting member (3) which selectively locks the upper pipe (2) to the upper end of the lower pipe (1) to adjust a length of the vertical pipe support,
   wherein the length adjusting member (3) includes:
   a coupler (31) which is formed in the shape of a hollow tube and has a lower end fixed to the lower pipe (1), of which an outer peripheral surface is formed with a threaded portion (311), and an upper portion of an inner peripheral surface is formed with a tapered portion (312) with a diameter being decreased toward a lower portion;
   a wedge (32) which is divided into a plurality of segments at regular intervals to lock the upper pipe (2) to be inserted therein, of which a portion of a lower portion is inserted in the tapered portion (312) of the coupler (31), and an outer peripheral surface of an upper portion is formed with a locking groove (321); and
   a first rotation adjustor (33) having a female threaded portion (331) formed on an inner peripheral surface which is threadedly engaged to the outer peripheral surface of the upper portion of the coupler (31), and a wedge locking boss (332) formed on an inner portion of an upper end which is inserted into the locking groove (321) of the wedge (32) to be able to move in a vertical direction,
   in which a first saw-toothed portion (322) is formed on the inner peripheral surface of the wedge (32) in a circumferential direction to have a desired height from a lower end thereof, and a second saw-toothed portion (323) is formed on the inner peripheral surface above the first saw-toothed portion (322) in the circumferential direction, and extends to an upper end of the peripheral surface, and
   in which any one of the first saw-toothed portion (322) and the second saw-toothed portion (323) is inclined upwardly so as to suppress downward movement of the upper pipe (2), and the other is inclined downwardly or is formed in the shape of a ridge so as to suppress upward movement of the upper pipe (2).

2. The adjustable vertical pipe support according to claim 1, wherein the first saw-toothed portion (322) is inclined upwardly, and the second saw-toothed portion (323) is inclined downwardly or formed in the shape of the ridge.

3. The adjustable vertical pipe support according to claim 1, wherein the coupler (31) is divided into a first upper coupler (31a) and a second lower coupler (31b),
   the first coupler (31a) and the second coupler (31b) are formed with a threaded portion (311) on outer peripheral surfaces thereof, so that the first rotation adjustor (33) is threadedly engaged to an outer peripheral surface of an upper portion of the first coupler (31a), and
   a second rotation adjustor (34) is formed with a female threaded portion (341) on inner peripheral surfaces thereof, so that the second rotation adjustor (34) is threadedly engaged to an outer peripheral surface of a lower portion of the first coupler (31a) and the second coupler (31b) to adjust a distance between the first coupler (31a) and the second coupler (31b) by rotation.

4. The adjustable vertical pipe support according to claim 3, wherein the inner peripheral surface of the lower end of the second coupler (31b) is formed with a stepped portion (313), so that the lower pipe (1) is interference fitted to the stepped portion (313).

5. The adjustable vertical pipe support according to claim 3, wherein the first coupler (31a) and the second coupler (31b) are configured in such a way that the lower end of the first coupler (31a) is inserted into the upper end of the second coupler (31b), or the upper end of the second coupler (31b) is inserted into the lower end of the first coupler (31a), and then the lower portion of the first coupler (31a) is partially overlapped with the upper portion of the second coupler (31b).

6. The adjustable vertical pipe support according to claim 5, wherein a contact surface between the lower portion of the first coupler (31) and the upper portion of the second coupler (31b) which are overlapped with each other are formed with guide bosses (314) and guide grooves (315) in a vertical direction, respectively.

* * * * *